United States Patent
Tseng et al.

(10) Patent No.: US 6,338,182 B1
(45) Date of Patent: Jan. 15, 2002

(54) HINGE ASSEMBLY

(75) Inventors: Wen-Hung Tseng, Tu-Chen; Nien Chiang Liao, Lu-Chou, both of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/603,797

(22) Filed: Jun. 26, 2000

(30) Foreign Application Priority Data

Jan. 28, 2000 (TW) ......................................... 089201591

(51) Int. Cl.⁷ .............................. E05D 5/10; E05D 7/10
(52) U.S. Cl. .............................. 16/386; 16/387; 16/229; 16/262; 361/680; 361/686; 439/165; 439/31
(58) Field of Search .......................... 16/386, 387, 229, 16/230, 231, 340, 342, 341, 262, 257; 379/433, 434; 361/680, 681, 682, 683, 686, 725; 248/917–924; 381/300, 334; 403/146, 147, 165; 439/165, 31

(56) References Cited

U.S. PATENT DOCUMENTS

| | | | | |
|---|---|---|---|---|
| 4,450,495 A | * | 5/1984 | Naruki | 381/300 |
| 5,088,156 A | * | 2/1992 | Hosoi | 16/342 |
| 5,274,882 A | * | 1/1994 | Persson | 16/341 |
| 5,333,356 A | * | 8/1994 | Katagiri | 16/342 |
| 5,390,075 A | * | 2/1995 | English et al. | 361/683 |
| 5,666,694 A | * | 9/1997 | Slow et al. | 16/368 |
| 5,751,544 A | * | 5/1998 | Song | 16/261 |
| 5,827,082 A | * | 10/1998 | Laine | 439/165 |
| 5,881,150 A | * | 3/1999 | Persson | 379/433 |
| 5,995,373 A | * | 11/1999 | Nagai | 439/165 |
| 6,040,978 A | * | 3/2000 | Spencer | 361/683 |
| 6,249,951 B1 | * | 6/2001 | Saida et al. | 16/341 |

* cited by examiner

*Primary Examiner*—Chuck Y. Mah
(74) *Attorney, Agent, or Firm*—Wei Te Chung

(57) ABSTRACT

A computer has a base and a speaker pivotably attached to the base via a hinge assembly. A cable extends through the hinge assembly to electrically connect the base and the speaker. The hinge assembly includes a pair of bushings fixed to the base, a sleeve fixed to the speaker and a pair of shafts. The pair of shafts is retained in opposite ends of the sleeve and is rotatably received in the bushings for pivotably attaching the speaker to the base. An aperture is defined in one of the bushings, a notch is defined in the sleeve, and a bore is defined through the shaft for providing access to the cable.

14 Claims, 9 Drawing Sheets

HINGE ASSEMBLY

BACKGROUND OF THE INVENTION

1. Field of the Invention

The present invention is related to a hinge assembly for a device requiring electrical connection between two parts moveable relative to one another, such as a computer having a moveable speaker or a moveable display, and particularly to a hinge assembly which can be readily assembled with the device and which provides access to a cable.

2. The Related Art

Hinge assemblies are widely used to pivotably connect different parts of a device, such as a display and a base of a portable computer. Hinge assemblies allow the device to be closed in a relatively compact and protected configuration when not in use and to be opened to an easily used position when in use.

An example of a conventional hinge assembly is disclosed in Taiwan Patent Application No. 81201626 for a notebook computer. Referring to FIG. 1 of the attached drawings, a hinge assembly includes a rotating shaft 1, a pair of washers 2, a base bracket 3 between the washers 2, a pair of resilient plates 4 oppositely abutting against each other, a bushing 5, a torsion spring 6, a positioning board 7 and a locknut 8. The rotating shaft 1 and the base bracket 3 have a complicated structure and thus a high manufacturing cost. Furthermore, since the hinge assembly includes many components, the procedure of assembling the hinge assembly to a notebook computer is laborious and time-consuming. Additionally, the hinge assembly does not provide a protected pathway for a cable which electrically connects different parts of the notebook computer to which the hinge assembly is connected.

Another example of a conventional hinge assembly used in a notebook computer is disclosed in U.S. Pat. No. 5,566,048. Referring to FIG. 2 of the attached drawings, a hinge assembly includes a mounting arm 38, a spring isolator 46, a torsion spring 60, a clutch mechanism 100 and a friction bushing 126. A slot 130 is defined at a center of the hinge assembly to provide access to a cable 140 for electrically connecting different parts between which the hinge assembly is attached. However, the structure of the hinge assembly is complicated and has a high manufacturing cost. Furthermore, the procedure of assembling the hinge assembly to a notebook computer is laborious and time-consuming. Additionally, an angle within which the different parts of the computer are rotatable relative to each other is limited within 150 degrees.

SUMMARY OF THE INVENTION

Accordingly, an object of the present invention is to provide a hinge assembly having a simple structure and being readily assembled.

Another object of the present invention is to provide a hinge assembly enhancing access to a cable for facilitating electrically connecting different parts of a device between which the hinge assembly is arranged.

A further object of the present invention is to provide a hinge assembly allowing a large angular range of movement.

To achieve the above-mentioned objects, a computer has a base and a speaker pivotably attached to the base via a hinge assembly. A cable extends through the hinge assembly to electrically connect the base and the speaker. The hinge assembly comprises a pair of bushings fixed to the base, a sleeve fixed to the speaker and a pair of shafts. The pair of shafts is retained in opposite ends of the sleeve and is rotatably received in the bushings for pivotably attaching the speaker to the base. An aperture is defined in one of the bushings, a notch is defined in the sleeve, and a bore is defined through the shaft for extension of the cable.

BRIEF DESCRIPTION OF THE DRAWINGS

Other objects and advantages of the present invention will be understood from the following description of a hinge assembly according to the preferred embodiment of the present invention as shown in the accompanying drawings, in which.

DETAILED DESCRIPTION OF THE PREFERRED EMBODIMENT

Figure 1:
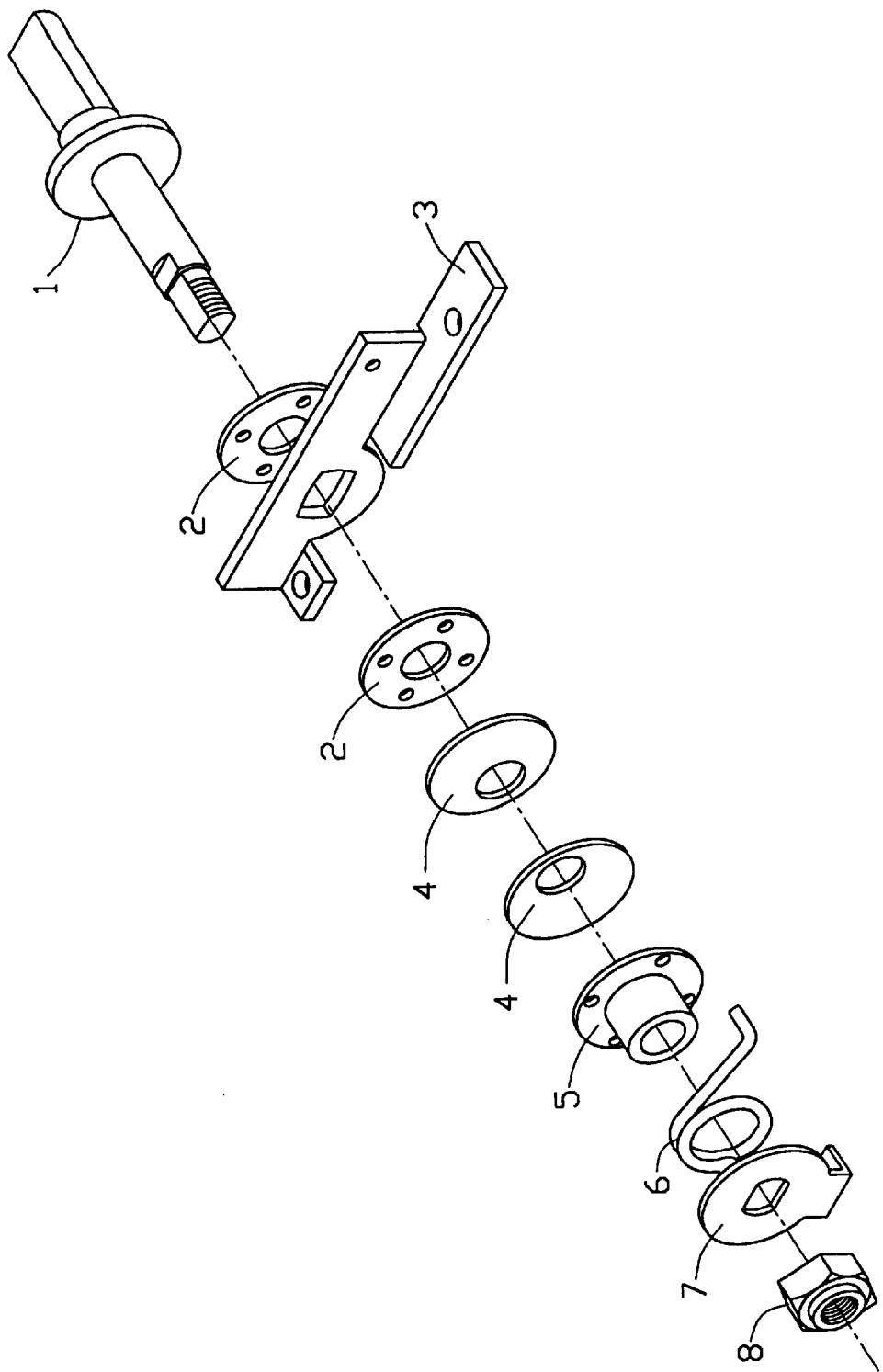
FIG. 1 is an exploded view of a conventional hinge assembly.
Figure 2:
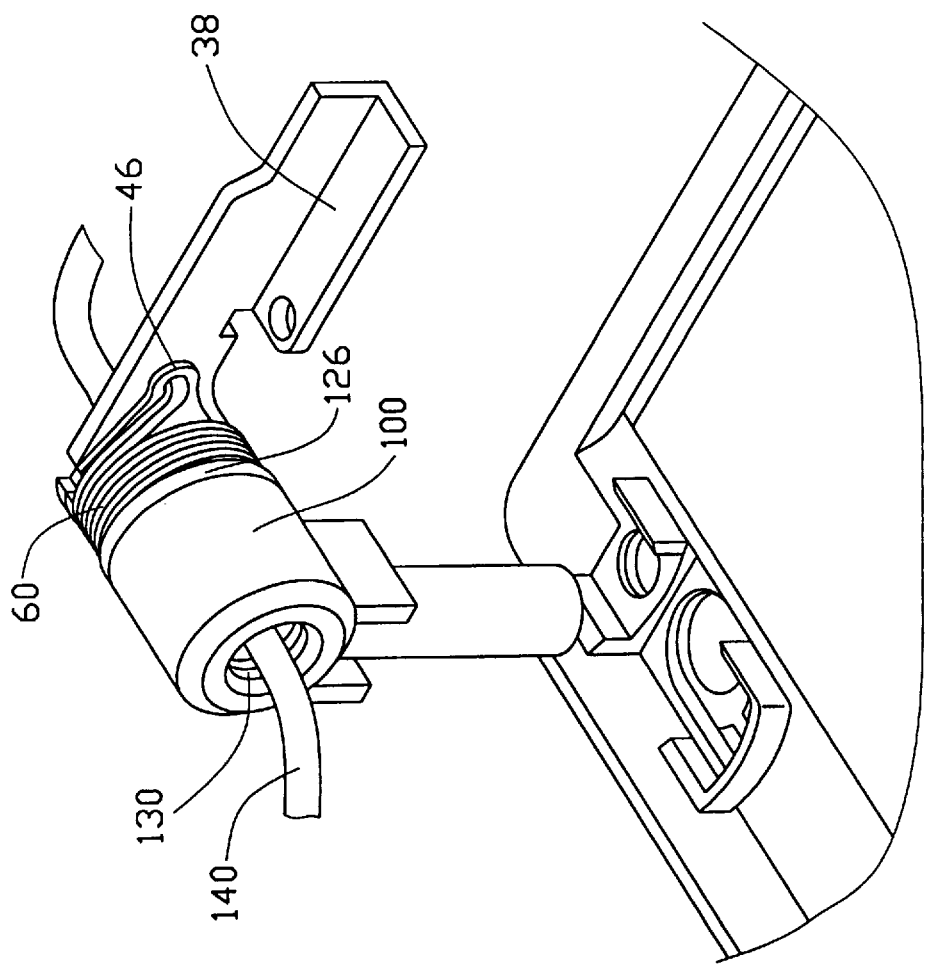
FIG. 2 is a perspective view of another conventional hinge assembly.
Figure 3:
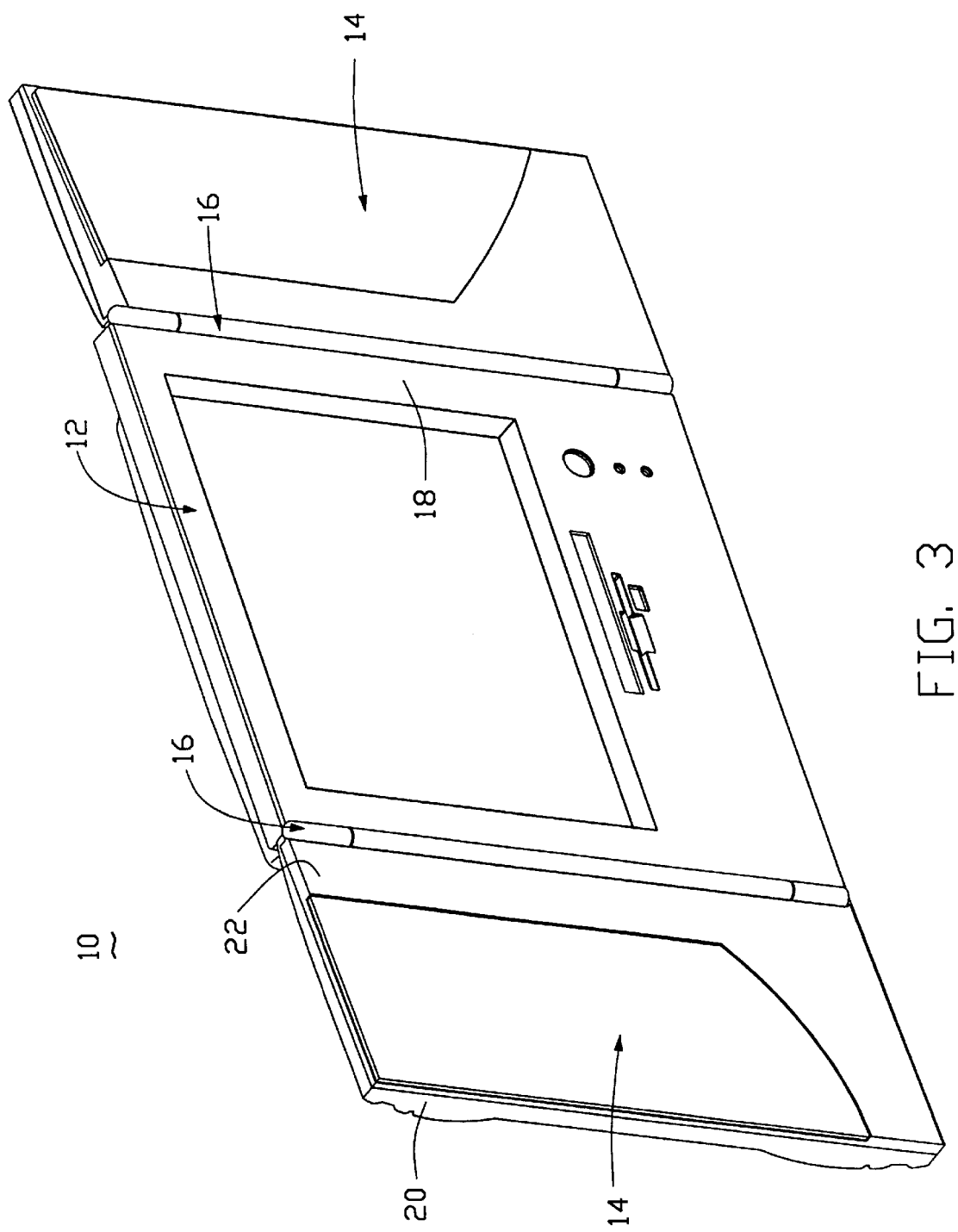
FIG. 3 is a perspective view of a computer having a hinge assembly of the present invention.
Figure 4:
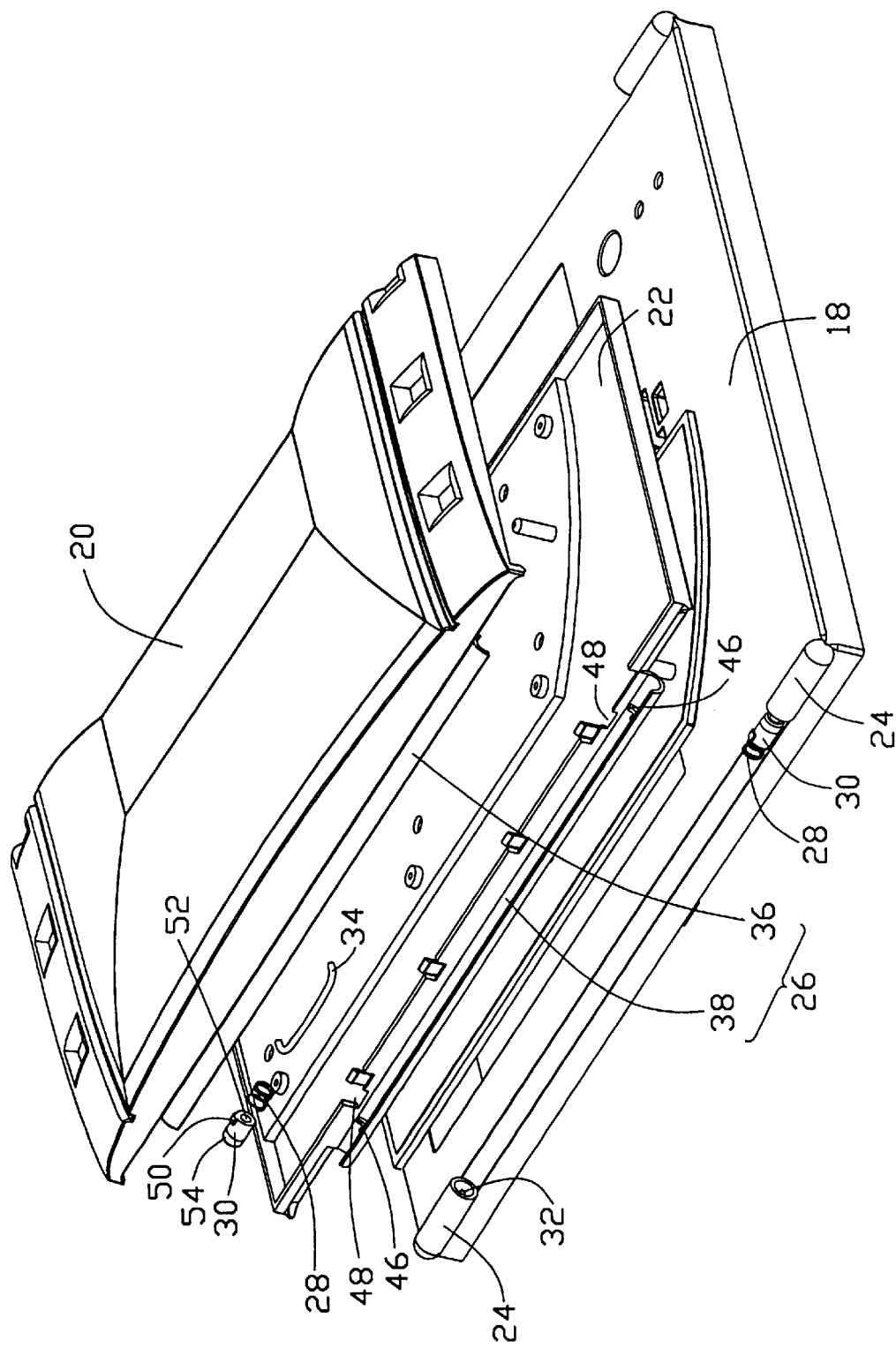
FIG. 4 is an exploded view of a part of the computer of FIG. 3 showing the hinge assembly.
Figure 5:
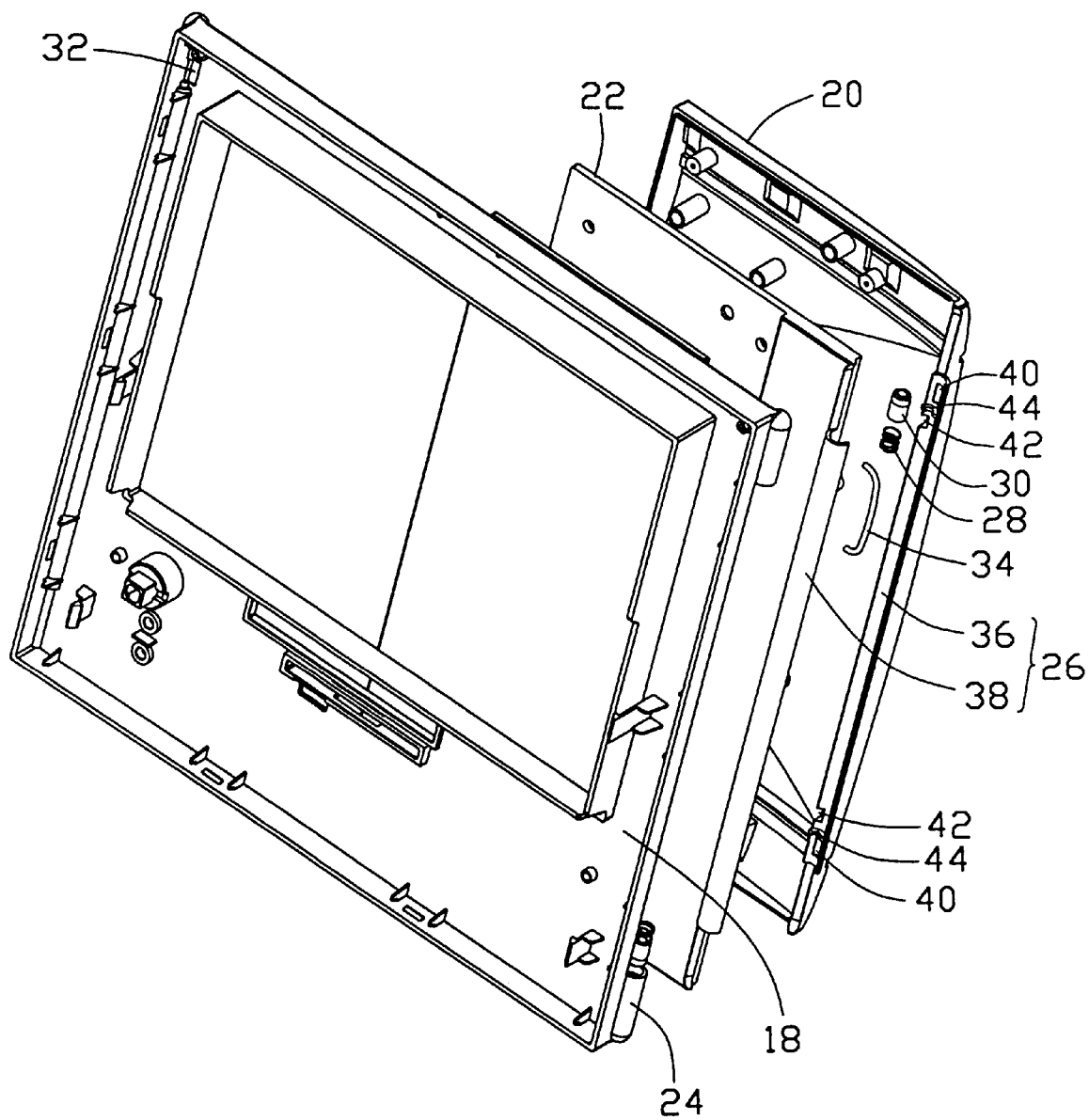
FIG. 5 is similar to FIG. 4 but viewed from a different perspective.

Referring to FIGS. 3–5, a computer 10 incorporating a hinge assembly in accordance with the present invention is shown. The computer 10 includes a base 12 and a pair of speakers 14 pivotally attached to the base 12 via a pair of hinge assemblies 16 of the present invention. The base 12 includes a display housing 18. Each speaker 14 includes a speaker housing 20 and a cover 22 mounted on the speaker housing 20. Each hinge assembly 16 includes a pair of bushings 24, a sleeve 26, a pair of springs 28 and a pair of shafts 30. The pair of springs 28 and shafts 30 are respectively received in the opposite ends of the sleeve 26. Each pair of bushings 24 is fixedly mounted on each of opposite sides of the display housing 18. A pair of apertures 32 is respectively defined in each bushing 24 in communication with an inner space (not labeled) of the display housing 18 for providing access to cables 34. The sleeve 26 includes an arcuate first part 36 integrally extending from the speaker housing 20 and an arcuate second part 38 integrally extending from the cover 22.

A pair of recesses 40 is defined in the first part 36 proximate opposite ends thereof. A pair of cutouts 42 is defined between the recesses 40. A pair of first second ribs 44 is formed between the recesses 40 and the cutouts 42. The second part 38 forms a pair of arcuate second ribs 46 aligning with the first ribs 44 of the first part 36 for supporting the springs 28. A pair of notches 48 is defined in the second part 38 corresponding to the cutouts 42 of the first part 36 for providing access to the cables 34. Each shaft 30 forms a protrusion 50 at a side surface thereof for being movably received in the corresponding recess 40 of the first part 36. A bore 52 is defined through the shaft 30 for extension of the cable 34. A post 54 extends from the shaft 30 for being rotatably received in the bushing 24.

Figure 6:
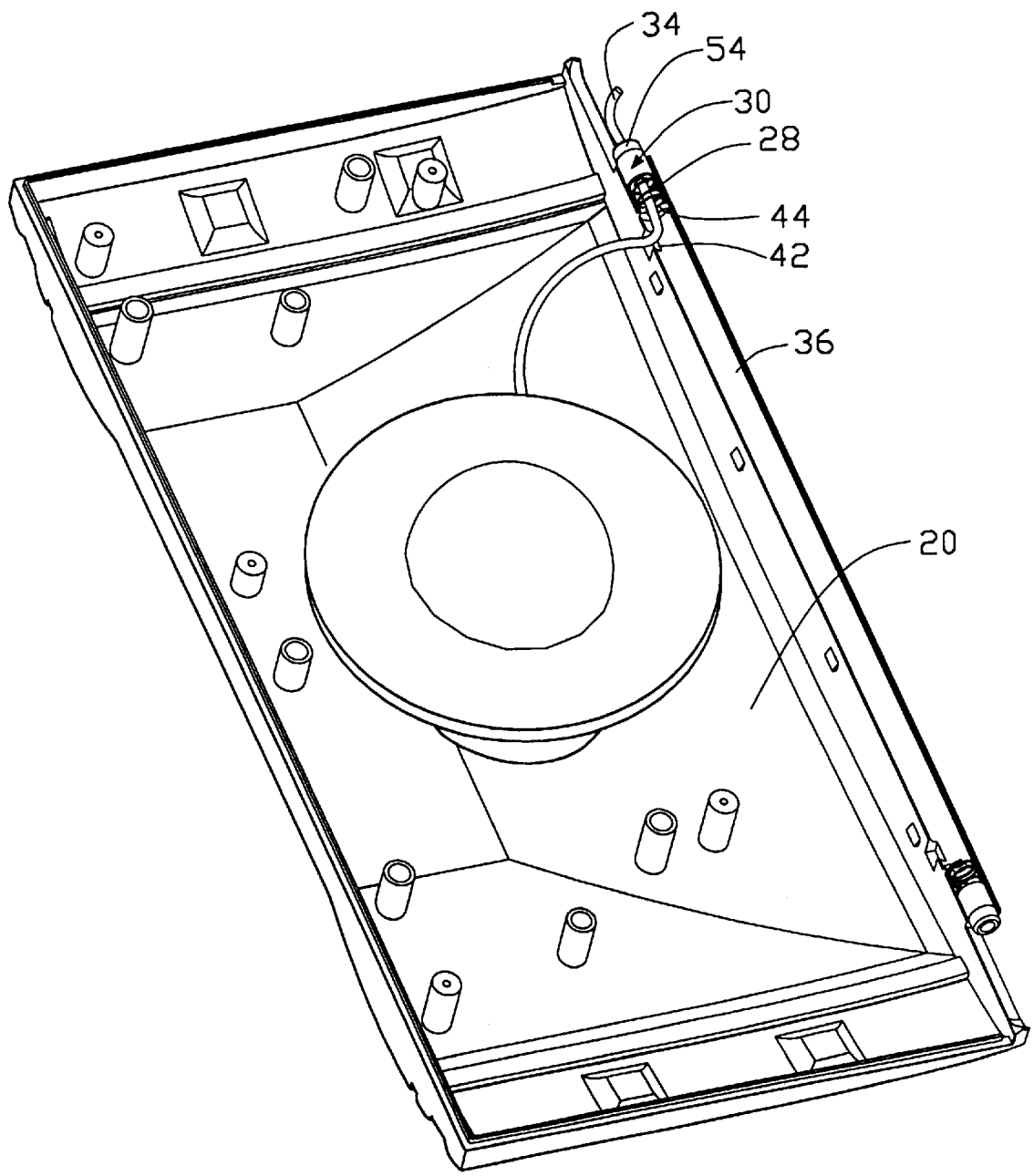
FIG. 6 is a perspective view of a part of a speaker showing its assembly with the hinge assembly of the present invention.
Figure 7:
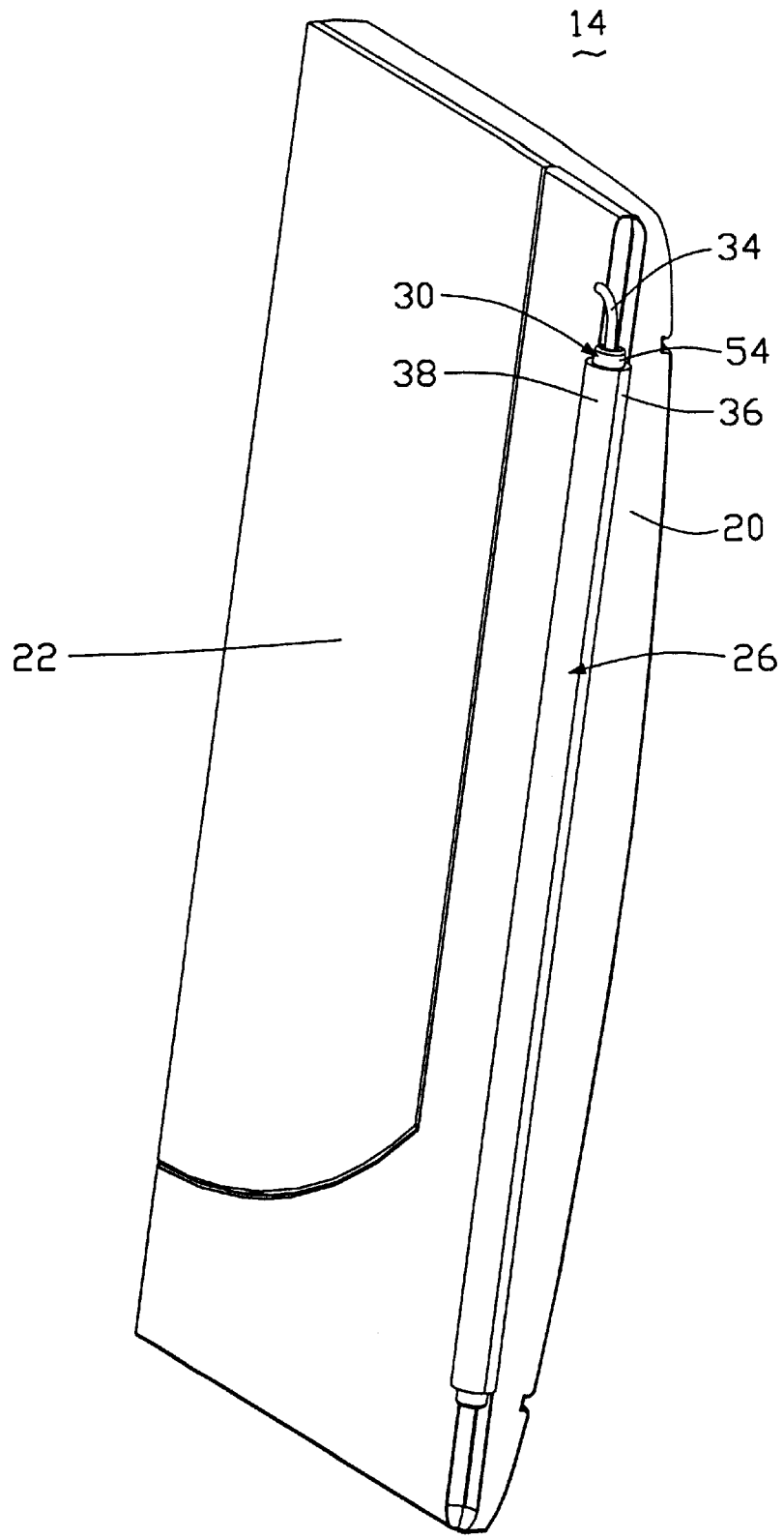
FIG. 7 is a perspective view of the speaker showing a part of the hinge assembly.
Figure 8:
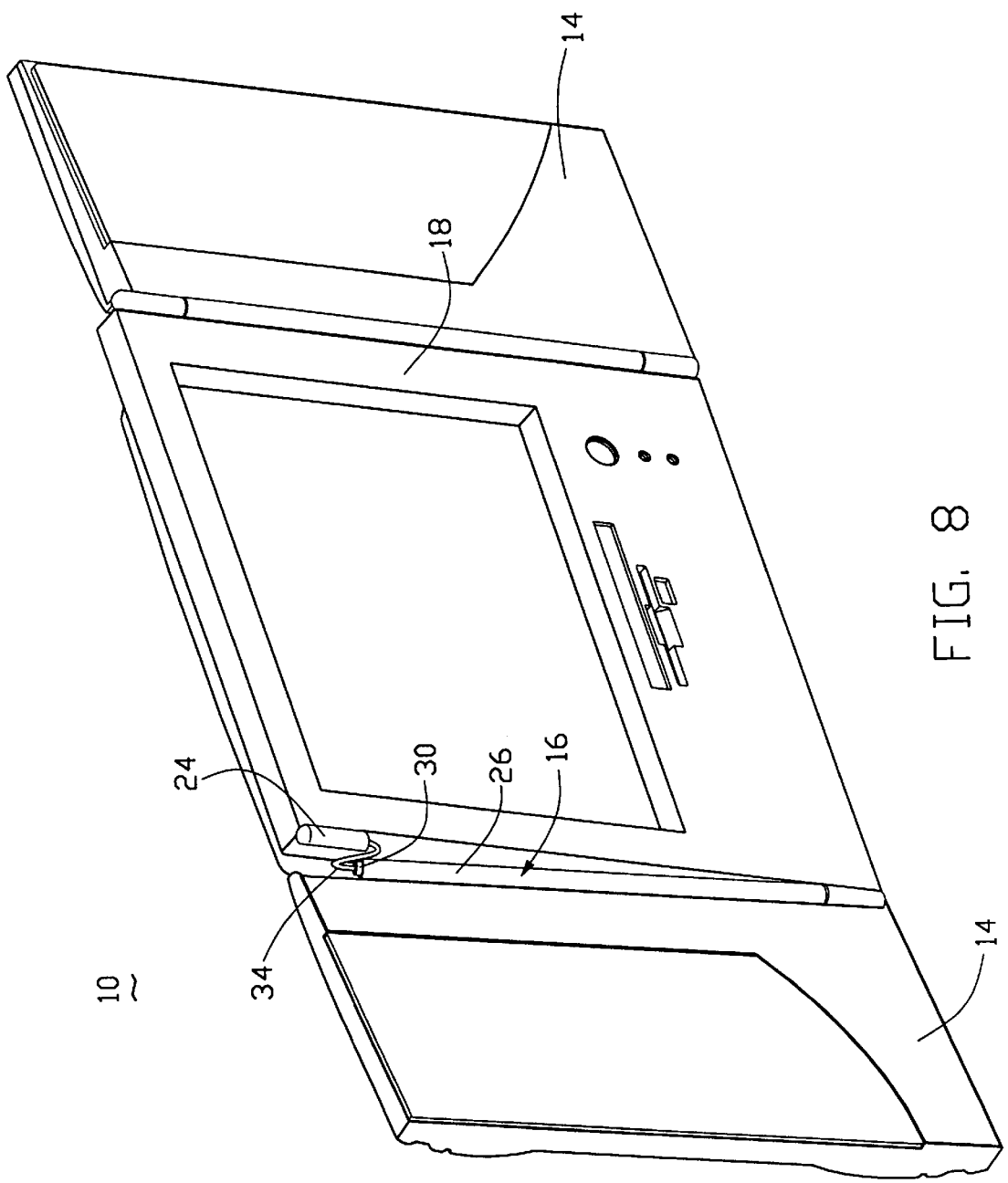
FIG. 8 is similar to FIG. 3 but showing the speaker partially detached from a display housing of the computer.

Referring to FIGS. 6 and 7, in assembly, the shafts 30 are movably received in the opposite ends of the first part 36 of the sleeve 26 with the protrusions 50 thereof being movably received in the recesses 40 (see FIG. 4) of the first part 36. The springs 28 are received between the shafts 30 and the first ribs 44 of the first part 36 for biasing the shafts 30. The cable 34 extends through the cutout 42, the first rib 44, the spring 28 and the bore 52 of the shaft 30. Then the cover 22 is mounted on the speaker housing 20 with the second part 38 thereof coupled to the first part 36 to form the sleeve 26. Also referring to FIG. 8, the speakers 14 are pivotably attached to the display housing 18 with the posts 54 of the shafts 30 extending into the bushings 24 of the hinge assembly 16 via resilient deformation of the springs 28. The cable 34 extends through the aperture 32 and into the inner space of the display housing 18 for electrically connecting the base 12 and the speakers 14. Thus, the hinge assembly 16 is readily assembled and provides access to the cable 34. Furthermore, the structure of the hinge assembly 16 is simple.

Figure 9:
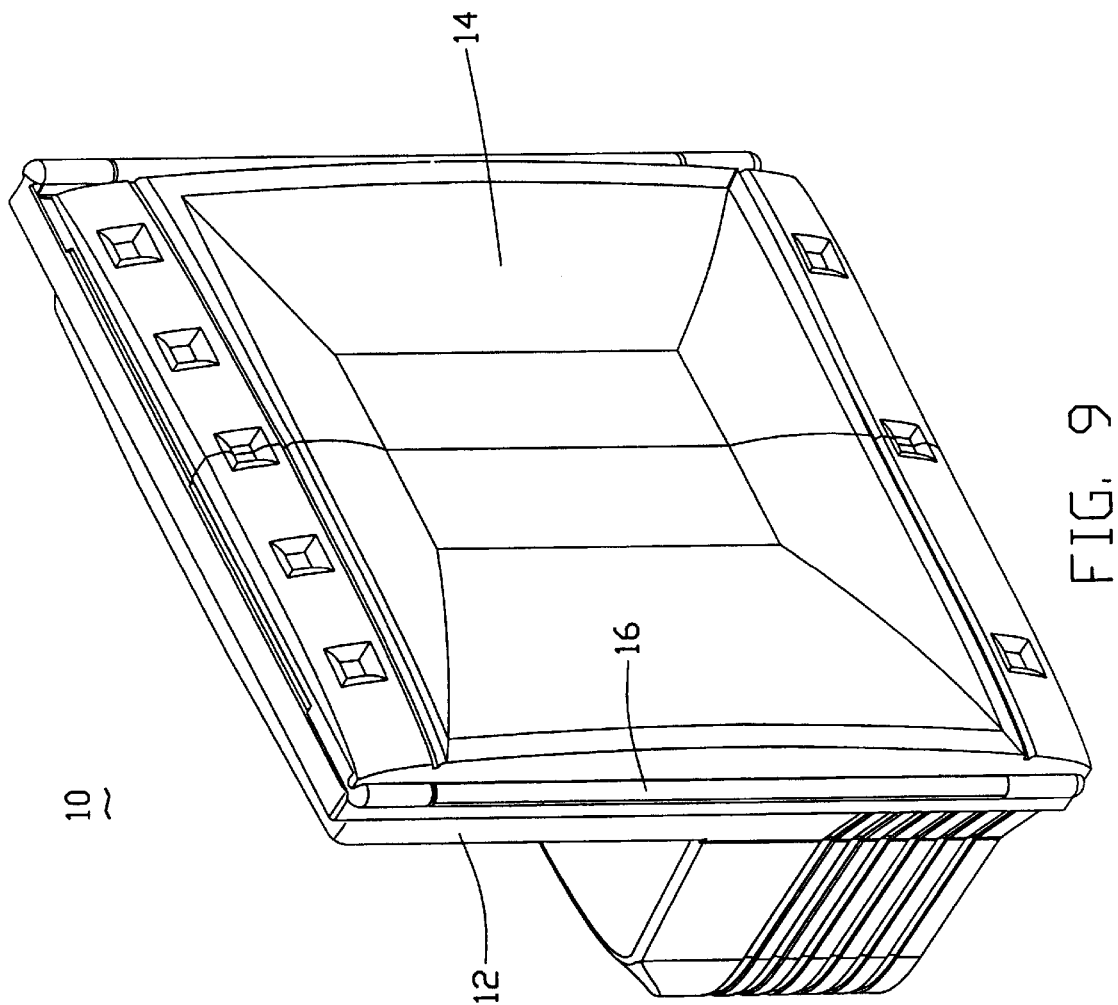
FIG. 9 is similar to FIG. 3 but showing the speakers in their closed position relative to the display housing of the computer.

Referring to FIGS. 3 and 9, the speakers 14 are pivotable about the base 12 within an angular range of 180 degrees between a fully open position as shown in FIG. 3 and a closed position as shown in FIG. 9. Apparently, a different angular range of movement may be obtained by suitably configuring the display housing 18 and the speaker housing 20. Thus, the hinge assembly 16 allows the speaker 14 to pivot about the base 12 within a large and variable angular range.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer having a base and a speaker pivotally attached to the base via a hinge assembly, a cable extending through the hinge assembly to electrically connect the base and the speaker, the hinge assembly comprising:
    a pair of bushings fixed to the base, an aperture being defined through one of the bushings and being in communication with an interior space of the base for extension of the cable;
    a sleeve fixed to the speaker and defining a notch for providing access to the cable; and
    a pair of shafts retained in opposite ends of the sleeve and rotatably received in the bushings for pivotally attaching the speaker to the base, a bore being defined through one of the shafts for providing access to the cable.

2. The computer as described in claim 1, wherein the sleeve comprises an arcuate first part and an arcuate second part both integrally extending from the speaker.

3. The computer as described in claim 1, wherein a recess is defined in the sleeve for movably receiving a protrusion formed on a side surface of the corresponding shaft.

4. The computer as described in claim 1, wherein a rib is formed in the sleeve for supporting each shaft.

5. The computer as described in claim 4, wherein a spring is received in the sleeve between the rib and the corresponding shaft.

6. The computer as described in claim 1, wherein a post extends from the shaft for being rotatably received in the corresponding bushing.

7. A hinge assembly adapted to pivotably connect first and second portions of a device together, the hinge assembly comprising:
    a pair of bushings fixed to the first portion of the device;
    a sleeve fixed to the second portion of the device, a pair of ribs being formed in the sleeve proximate opposite ends thereof;
    a pair of shafts retained in opposite ends of the sleeve and rotatably received in the bushings for pivotally attaching the second portion to the first portion; and
    a spring received in the sleeve between each shaft and the corresponding rib for biasing the shaft.

8. The hinge assembly as described in claim 7, wherein an aperture is defined through one of the bushings for providing access to a cable.

9. The hinge assembly as described in claim 7, wherein the sleeve comprises an arcuate first part and an arcuate second part.

10. The hinge assembly as described in claim 7, wherein a recess is defined in the sleeve proximate each opposite end thereof, and wherein each shaft forms a protrusion at a side surface thereof for being movably received in the corresponding recess of the sleeve.

11. The hinge assembly as described in claim 7, wherein a notch is defined in the sleeve for providing access to a cable.

12. The hinge assembly as described in claim 7, wherein a bore is defined through each shaft for extension of a cable.

13. The hinge assembly as described in claim 7, wherein a post extends from each shaft for pivotably extending into the bushing.

14. A hinge assembly for use with relatively rotatable first and second devices, said hinge assembly comprising:
    a pair of bushings fixed to the first device;
    a sleeve fixed to the second device and positioned between said pair of bushings;
    a pair of shafts respectively retainably positioned at two opposite ends of the sleeve, each of said shafts including an outwardly extending post;
    a pair of springs respectively positioned around the corresponding ends of the sleeve and outwardly urging the corresponding posts to extend into the corresponding bushings; and
    a pair of cables each coaxially extending from the sleeve through the corresponding spring, shaft and post, into the corresponding bushing.

* * * * *